United States Patent
Oishi

(10) Patent No.: US 8,514,446 B2
(45) Date of Patent: Aug. 20, 2013

(54) INFORMATION PROCESSING APPARATUS, COLOR/MONOCHROME DETERMINATION METHOD THEREFOR, AND PROGRAM FOR IMPLEMENTING THE METHOD

(75) Inventor: Tetsu Oishi, Kawasaki (JP)

(73) Assignee: Canon Kabushiki Kaisha (JP)

( * ) Notice: Subject to any disclaimer, the term of this patent is extended or adjusted under 35 U.S.C. 154(b) by 1338 days.

(21) Appl. No.: 11/412,607

(22) Filed: Apr. 27, 2006

(65) Prior Publication Data

US 2006/0244988 A1 Nov. 2, 2006

(30) Foreign Application Priority Data

Apr. 27, 2005 (JP) ................................ 2005-130568

(51) Int. Cl.
*G06F 15/00* (2006.01)
*G06F 3/12* (2006.01)

(52) U.S. Cl.
USPC ........... 358/1.9; 358/1.13; 358/1.11; 358/2.1; 345/501; 382/162; 382/177

(58) Field of Classification Search
CPC .................................. G06F 3/12; G06F 15/00
USPC ....... 358/1.1, 1.9, 2.1, 3.23, 3.24, 1.11–1.18, 358/537–540, 515, 462; 345/467, 522, 501; 382/164, 165, 177; 715/243–250, 273
See application file for complete search history.

(56) References Cited

U.S. PATENT DOCUMENTS

| 4,858,148 | A | * | 8/1989 | Ueda ............................ 358/1.11 |
| 5,825,987 | A | * | 10/1998 | Asada .......................... 358/1.11 |
| 6,120,197 | A | * | 9/2000 | Kawamoto et al. ............. 400/61 |
| 6,281,982 | B1 | * | 8/2001 | Nagoya ........................ 358/1.18 |
| 2001/0005207 | A1 | * | 6/2001 | Muikaichi et al. ............ 345/467 |
| 2002/0015171 | A1 | * | 2/2002 | Tsunekawa ................... 358/1.13 |
| 2004/0111665 | A1 | * | 6/2004 | Ishihara ....................... 715/502 |

FOREIGN PATENT DOCUMENTS

JP 10-285421 A 10/1998

OTHER PUBLICATIONS

Maria Langer, Microsoft Word 2004 for MAC OS X: Visual Quick Start, Pub Date: Dec. 20, 2004, Publisher: Peachpit Press, pp. 57-59.*
Walter Glenn, Word 2000 in a Nutshell, Pub Date: Aug. 18, 2000, Publisher: O'Reilly Media.*

* cited by examiner

*Primary Examiner* — Chad Dickerson
(74) *Attorney, Agent, or Firm* — Rossi, Kimms & McDowell LLP

(57) ABSTRACT

An information processing apparatus which is capable of efficiently performing color/monochrome determination of characters as a print object. A printer driver determines whether a character as the print object is a character which is necessary to be drawn or a character which is not necessary to be drawn. Then, when the character as the print object is determined to be a character which is not necessary to be drawn, the printer driver determines that the character as the print object is in monochrome.

24 Claims, 5 Drawing Sheets

INFORMATION PROCESSING APPARATUS, COLOR/MONOCHROME DETERMINATION METHOD THEREFOR, AND PROGRAM FOR IMPLEMENTING THE METHOD

BACKGROUND OF THE INVENTION

1. Field of the Invention

The present invention relates to an information processing apparatus, a color/monochrome determination method therefor, and a program for implementing the method.

2. Description of the Related Art

There has conventionally been proposed a technique called the automatic color/monochrome switching, in which color/monochrome determination is performed on data to be printed and when there exists only monochrome data within a page, the data of the page is processed as monochrome data.

For example, when the printing speed of a printer is different between color printing and monochrome printing, or when the billing amount is different between color printing and monochrome printing, the above-mentioned technique is essential because it enables users to enjoy optimal running costs and printing speed.

Further, there has already been disclosed a prior art printing system to which the color/monochrome determination is applied (see e.g. Japanese Laid-Open Patent Publication (Kokai) No. 10-285421).

The main object of execution of the color/monochrome determination in the prior art printing system is to enable a printer engine to operate at the highest possible speed.

For this reason, a printer driver carries out a process for analyzing drawing information input from an application, and determining, if characters as a print object have color information set therefor, that the characters are "in color" (to be printed in color), whereas if not, that they are "in monochrome" (to be printed in monochrome).

Insofar as character codes are concerned, the conventional printer driver carries out the color/monochrome determination by only referring to the color attribute of each character.

However, characters include not only numerals, symbols, kanji characters, and like characters, which are actually drawn, but also a space character, and like characters, which have nothing to be drawn but are treated as characters since they are input in the form of character codes.

Therefore, if a character as a printing object includes such a character, which is not to be drawn but has color information set therefor, the conventional printer driver recognizes the character attribute of the character as "color" even though the print data provides an apparently "monochrome" print when actually printed. Therefore, the color processing mode for the page containing the character is determined to be set to "color".

For example, assuming that a character string "AB C" has a space character between "B" and "C", as shown in FIG. 5A, and the space character has a color setting of red, the character data of this character string is determined to be "in color".

Further, when an external character is to be printed, it is impossible to determine from its character code whether the character is actually drawn.

SUMMARY OF THE INVENTION

It is an object of the present invention to provide an information processing apparatus which is capable of efficiently performing color/monochrome determination of characters as a print object, a color/monochrome determination method therefor, and a program for implementing the method.

To attain the above object, in a first aspect of the present invention, there is provided an information processing apparatus for determining whether a print object is in color or monochrome, comprising a character determination unit that determines whether a character as the print object is a character which is necessary to be drawn or a character which is not necessary to be drawn, and a monochrome determination unit that is operable, in a case where the character determination unit determines that the character as the print object is a character which is not necessary to be drawn, to determine that the character as the print object is in monochrome.

Preferably, an information processing apparatus further comprises a color/monochrome determination unit that is operable, in a case where the character determination unit determines that the character as the print object is a character which is necessary to be drawn, to determine whether the character as the print object is in color or monochrome, based on a color attribute of a drawing object in the character as the print object.

Preferably, the character determination unit comprises a first determination unit that determines whether or not a typeface of the character as the print object belongs to typefaces of existing fonts, a second determination unit that is operable, in a case where the first determination unit determines that the typeface belongs to typefaces of existing fonts, to determine whether or not the character as the print object corresponds to an existing space character code, and a third determination unit that determines whether or not the character as the print object corresponds to an existing character code.

More preferably, in a case where the second determination unit determines that the character as the print object corresponds to an existing space character code, the character as the print object is determined to be a character which is not necessary to be drawn.

More preferably, in a case where the second determination unit determines that the character as the print object corresponds to an existing space character code and in a case where neither an additional image nor a background color is set for the character as the print object, the character as the print object is determined to be a character which is not necessary to be drawn.

More preferably, in a case where the second determination unit determines that the character as the print object does not correspond to an existing space character code and in a case where the third determination unit determines that the character as the print object corresponds to an existing character code, the character as the print object is determined to be a character which is necessary to be drawn.

Preferably, an information processing apparatus further comprises a drawing object determination unit that is operable, in a case where the character determination unit cannot determine whether the character as the print object is a character which is not necessary to be drawn or a character which is not necessary to be drawn, to determine based on a glyph whether or not the character as the print object contains a drawing object, and a color/monochrome determination unit that is operable, in a case where the drawing object determination unit determines that the character as the print object contains a drawing object, to determine whether the character as the print object is in color or monochrome, based on a color attribute of the drawing object in the character as the print object.

More preferably, in a case where the first determination unit determines that the typeface of the character as the print object does not belong to typefaces of existing fonts, the drawing object determination unit performs the determination. More preferably, in a case where the second determination unit determines that the character as the print object does not correspond to an existing space character code and in a case where the third determination unit determines that the character as the print object does not correspond to an existing character code, the drawing object determination unit performs the determination.

To attain the above object, in a second aspect of the present invention, there is provided a color/monochrome determination method for an information processing apparatus that determines whether a print object is in color or monochrome, comprising a character determination step of determining whether a character as the print object is a character which is necessary to be drawn or a character which is not necessary to be drawn, and a monochrome determination step of determining that the character as the print object is in monochrome, in a case where it is determined in the character determination step that the character as the print object is a character which is not necessary to be drawn.

To attain the above object, in a third aspect of the present invention, there is provided a program for causing a computer to execute a color/monochrome determination method for an information processing apparatus that determines whether a print object is in color or monochrome, comprising a character determination module for determining whether a character as the print object is a character which is necessary to be drawn or a character which is not necessary to be drawn, and a monochrome determination module for determining that the character as the print object is in monochrome, in a case where the character determination module has determined that the character as the print object is a character which is not necessary to be drawn.

The above and other objects, features, and advantages of the invention will become more apparent from the following detailed description taken in conjunction with the accompanying drawings.

BRIEF DESCRIPTION OF THE DRAWINGS

FIGS. 5A to 5D are views of examples of characters designated as print objects.

DETAILED DESCRIPTION OF THE PREFERRED EMBODIMENTS

The present invention will now be described in detail with reference to the drawings showing a preferred embodiment thereof. It should be noted that the relative arrangement of the components, the numerical expressions and numerical values set forth in the embodiment do not limit the scope of the present invention unless it is specifically stated otherwise.

Figure 1:
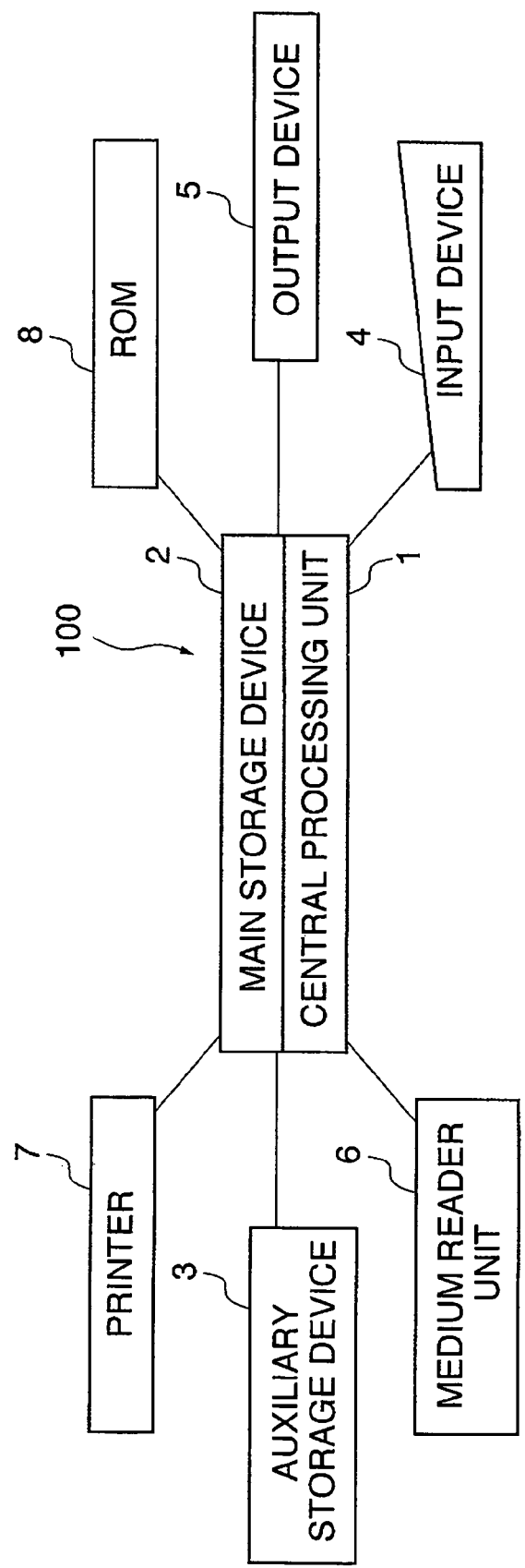
FIG. 1 is a schematic block diagram of a host apparatus as an information processing apparatus according to an embodiment of the present invention.

FIG. 1 is a schematic block diagram of a host apparatus as an information processing apparatus according to an embodiment of the present invention.

As shown in FIG. 1, the host apparatus 100 is comprised of a central processing unit (CPU) 1, and a main storage device (RAM) 2, and is equipped with a medium reader unit 6 that reads a program and related data recorded in a storage medium, such as an FD, a CD-ROM, a hard disk, or an IC memory card, and transmits the program and related data to the central processing unit 1, a ROM 8, an auxiliary storage device 3 implemented by the hard disk, a magnetic-optical disk, or the like, and an input device 4 implemented by a keyboard, a pointing device, and the like, all of which are interconnected by a bus.

Further, the host apparatus 100 is connected to an output device 5 implemented by a display device, such as a display, and to a printer 7 via a centronics interface.

The ROM 8 and the auxiliary storage device 3 load a system program, such as an operating system (OS), an application program, and a printer driver for generating print data to be printed by the printer 7, into the main storage device 2.

The host apparatus 100 outputs information input via the input device 4 and then processed by the system program and the application program, to the output device 5. Further, the host apparatus 100 outputs print data generated using the print driver to the printer 7.

Although in the present embodiment, the host apparatus 100 is connected to an external apparatus via the centronics interface, since the form of interfacing is not essential to the present invention, the centronics interface may be replaced by wireless communication utilizing infrared rays or electromagnetic waves, a serial bus, such as a USB or the IEEE 1394, or network connection.

Figure 2:
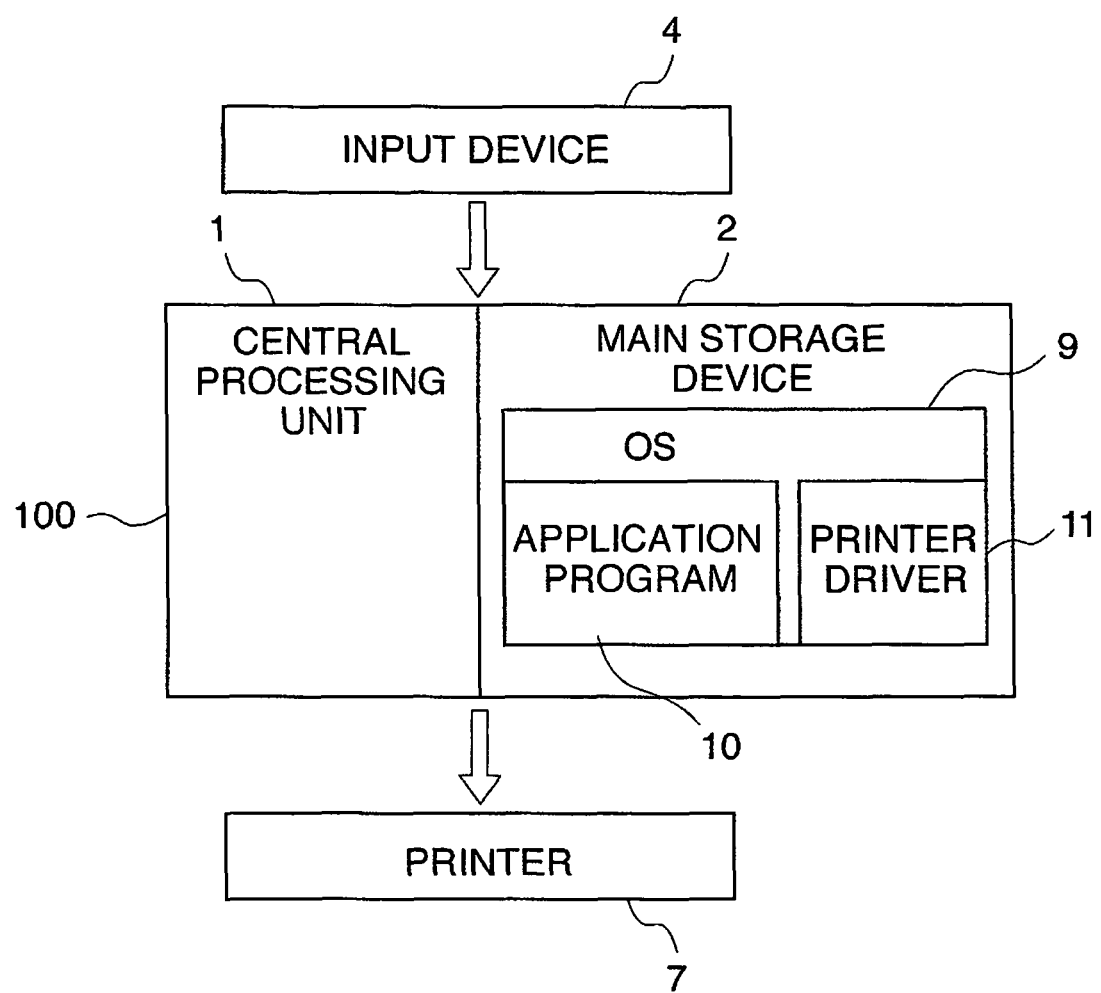
FIG. 2 is a diagram useful in explaining a printing process which is executed by a central processing unit appearing in FIG. 1.

FIG. 2 is a diagram useful in explaining a printing process which is executed by the central processing unit 1 appearing in FIG. 1.

As shown in FIG. 2, first, the central processing unit 1 reads an image processing program (an application program 10 and a printer driver 11) and related data stored in a storage medium mounted e.g. in the medium reader unit 6 (see FIG. 1) into the main storage device 2.

Next, in response to a print instruction input via the input device 4, the central processing unit 1 converts document data created by the application program 10 into print data interpretable by the printer 7, using the printer driver 11, and then sends the print data to the printer 7 for execution of printing.

The application program 10 and the printer driver 11 both operate under the control of the OS 9 loaded in the main storage device 2.

Figure 3:
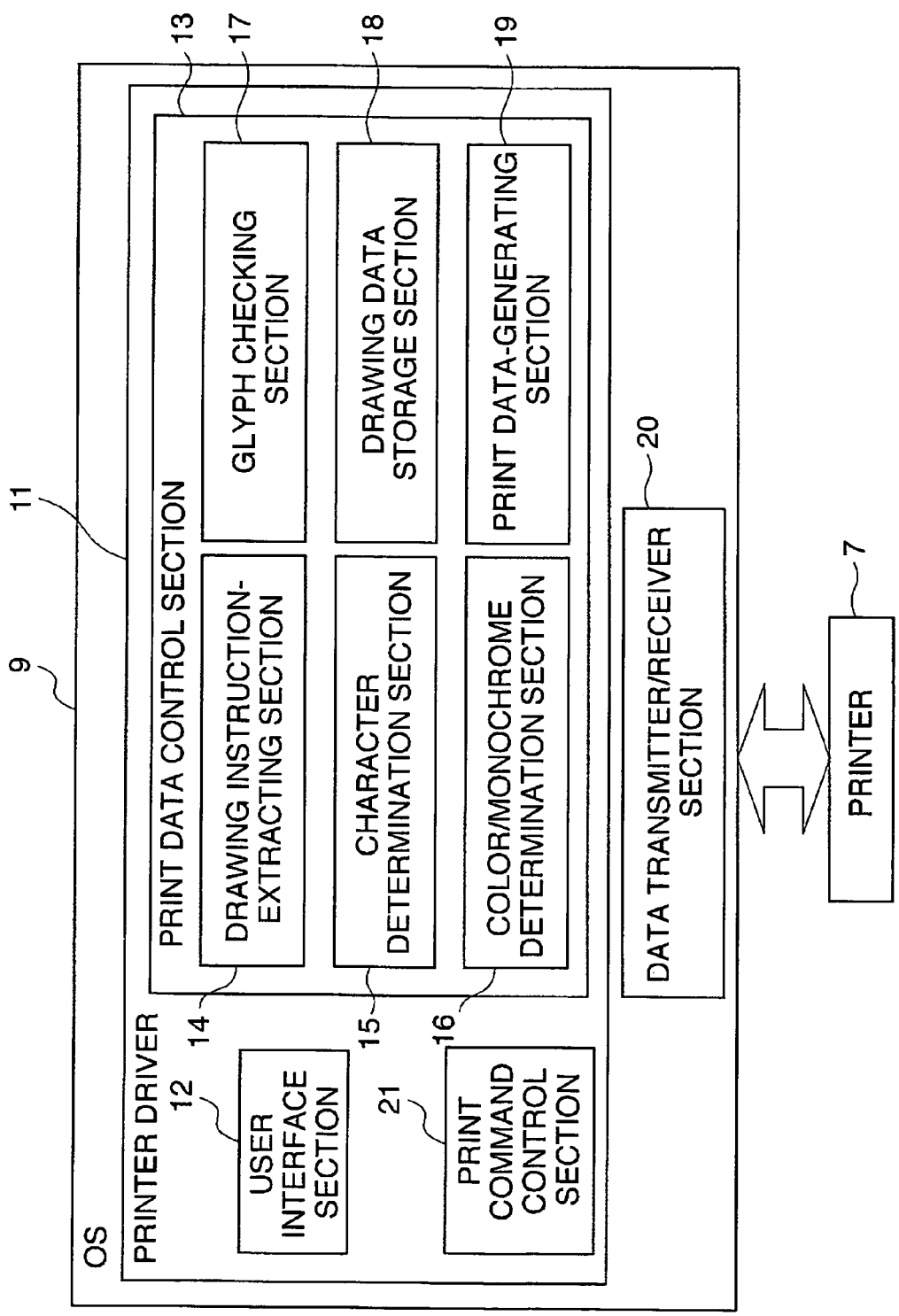
FIG. 3 is a block diagram schematically showing the configuration of functions of a printer driver appearing in FIG. 2.

FIG. 3 is a block diagram schematically showing the configuration of functions of the printer driver 11 appearing in FIG. 2.

In FIG. 3, the printer driver 11 is a software module for controlling the printer 7 under the control of the OS 9 that controls the overall operation of the host apparatus 100 shown in FIG. 1. A data transmitter/receiver section 20 (generally referred to as an "output spooler") provided by the OS 9 performs data transmission/reception between the printer driver 11 and the printer 7.

The printer driver 11 is comprised of a user interface section 12 that accepts various print settings input by the user of the host apparatus 100, for prints to be printed by the printer 7, and accepts an instruction for starting printing, a print data control section 13 that is responsive to a drawing instruction received from the application program 10 (see FIG. 2), for generating print data (e.g. in a PDL (Page Description Language)) that can be processed by the printer 7, based on the drawing instruction, and a print command control section 21 that converts the print data generated by the print data control section 13 into a print job (in a format wrapping PDL in JL (Job Language)) comprised of print commands to be transmitted to the printer 7.

Print data generated by the print data control section 13 is not particularly limited, but PDL data, bitmap data subjected to rendering, and the like data are generated as print data, for example.

The print data control section 13 performs processing characteristic of the present invention, and includes a drawing instruction-extracting section 14 that extracts a text drawing instruction, a character determination section 15 that determines whether or not a typeface of a character designated as a print object by the extracted drawing instruction belongs to typefaces of existing fonts (hereinafter referred to as "normal fonts"), whether or not the character is a space character, and whether or not the character includes an additional image to be drawn, such as a deletion line or an underline, and a color/monochrome determination section 16 that performs a color/monochrome determination process on a character code basis (hereinafter referred to as "the normal color/monochrome determination process").

Further, the print data control section 13 includes a glyph checking section 17 that performs accurate color/monochrome determination, based on a glyph (bitmap), on each character determined to be in a symbol font or the like nonnormal font or to be a space character code which is not an existing character code, by the character determination section 15, a drawing data storage section 18 that stores a drawing instruction itself passed from the OS 9 and drawing data in an intermediate language format, a printer description language (PDL) command format, a post-rendering color bitmap format, or the like, and a print data-generating section 19 that generates print data.

Next, the printing process will be described in detail with reference to FIGS. 2 and 3.

First, when a print instruction command for a document is input via the input device 4, the OS 9 of the host apparatus 100 receives this command.

The OS 9 having received the command instructs the currently active application program 10 to execute printing.

The application program 10 instructed by the OS 9 to execute printing converts print data and messages of the document corresponding to contents of the instruction into a drawing command (e.g. a GDI (Graphic Device Interface) function) recognizable by the OS 9, and sends the command to the OS 9.

The OS 9, which is provided with the function of converting a drawing function, converts the drawing command sent from the application program 10 into a drawing command (e.g. a DDI (Device Driver Interface) function) and messages recognizable by the printer driver 11, and sends the drawing command and the messages to the printer driver 11. When receiving the drawing command and the messages, the printer driver 11 executes the color/monochrome determination process, which will be described in detail below with reference to FIG. 4.

Then, the printer driver 11 sends a result of the color/monochrome determination and the print commands generated by the print data-generating section 19 to the data transmitter/receiver section 20.

When receiving the print commands and the result of the color/monochrome determination from the printer driver 11, the data transmitter/receiver section 20 transmits the received data to the printer 7.

Figure 4:
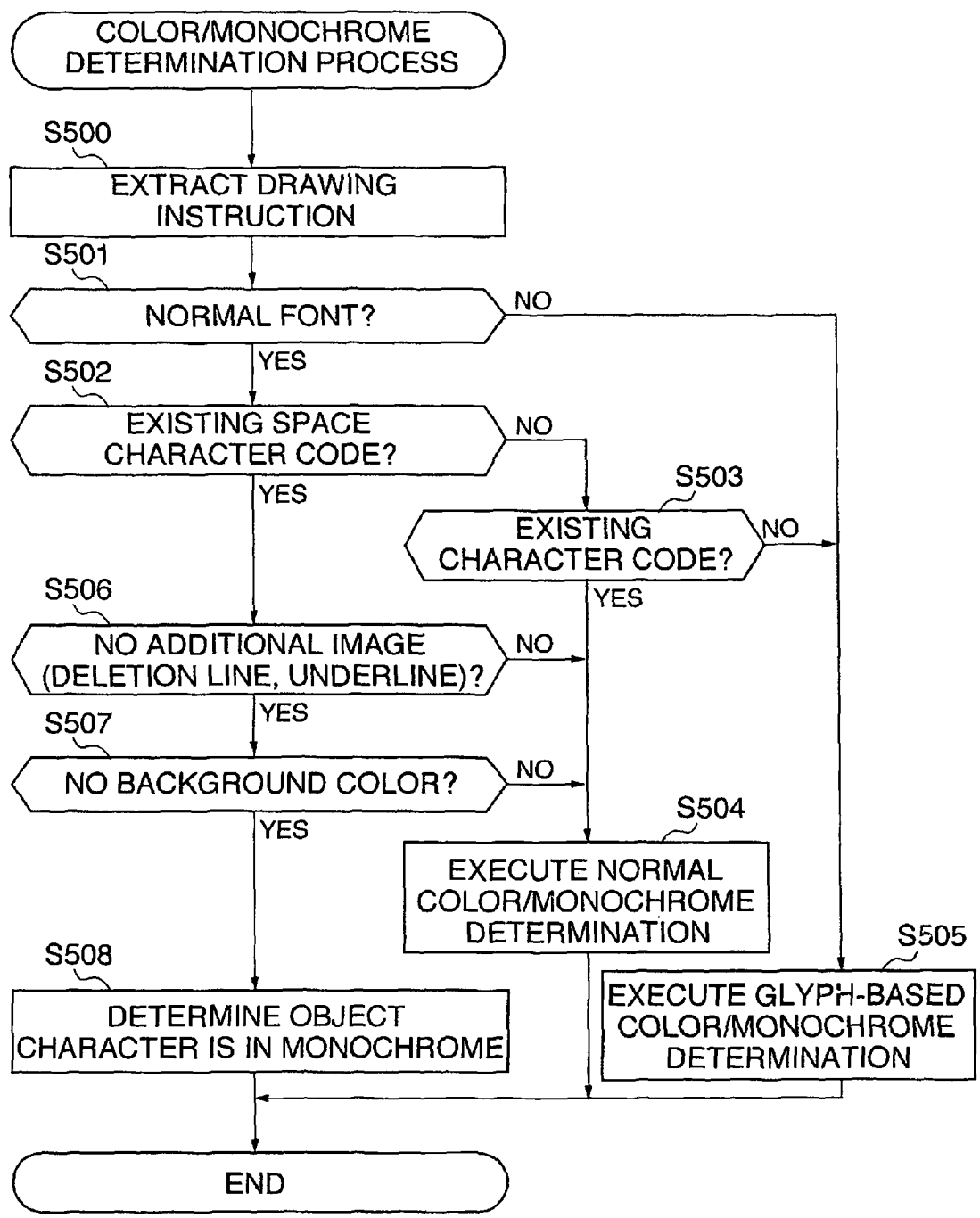
FIG. 4 is a flowchart showing the procedure of a color/monochrome determination process carried out by a print data control section appearing in FIG. 3.

FIG. 4 is a flowchart showing the procedure of the color/monochrome determination process carried out by the print data control section 13 appearing in FIG. 3.

As shown in FIG. 4, first, when a drawing command and messages are input to the printer driver 11 from the OS 9, the print data control section 13 causes the drawing instruction-extracting section 14 to extract a character drawing instruction from the input drawing command (step S500). The drawing instructions include a character drawing instruction, a graphics drawing instruction, an image drawing instruction, and an image processing instruction associated with a drawing object (an object to be drawn).

Next, the character determination section 15 determines whether or not a character designated as a print object (hereinafter referred to as "object character") in the drawing instruction extracted in the step S500 is a normal font (step S501). More specifically, in this step, when a face name (name indicative of a character font or a character code group) of the object character is one of existing face names registered in advance in the printer driver 11, it is determined that the object character is in a normal font.

Figure 5B:

If it is determined in the step S501 that the face name of the object character cannot be recognized by the printer driver 11, i.e. if the object character is not in a normal font (e.g. one of characters shown in FIG. 5B), the glyph checking section 17 of the printer driver 11 performs accurate color/monochrome determination based on a glyph (step S505), followed by terminating the present process. A glyph is a character shape in an abstracted form, which could be called "core lines defining a character". In short, whether there exists something to be drawn can be determined by recognizing the shape of a character by glyph processing. If a drawing object (character shape) exists, color/monochrome determination can be performed based on the color attribute of the character, whereas if no drawing object (character shape) exists, the object character is determined to be in monochrome even when the color attribute of the character is set to color.

On the other hand, if it is determined in the step S501 that the face name of the object character has been registered, i.e. if the object character is in a normal font, the character determination section 15 determines whether or not the object character corresponds to an existing space character code (step S502). In this case, since the printer driver 11 has recognized the face name, whether the object character corresponds to a space character code can be determined by the character code number of the object character.

If it is determined in the step S502 that the object character does not correspond to an existing space character code, the character determination section 15 determines whether or not the character code of the object character is an existing character code (step S503). Existing character codes are each defined under a face name, so that if the character code of an object character is one within a range defined by the face name, it can be determined that there exists a drawing object. However, when an object character is a character registered anew by a user, such as an external character, even if its character code is one of a known face name, it cannot be known that there exists a drawing object. Therefore, the character determination section 15 is required to determine whether or not the character code of the object character is an existing character code.

If it is determined in the step S503 that the character code of the object character is an existing character code, the color/monochrome determination section 16 performs the normal color/monochrome determination for determining whether the color attribute of the object character is color or monochrome (step S504). After execution of the color/monochrome determination for one page, the present process for determining the color processing mode is terminated.

On the other hand, if it is determined in the step S503 that the character code of the object character is not an existing one, the object character can be a space character registered as an external character, and hence the glyph checking section 17 performs the accurate color/monochrome determination based on a glyph (step S505).

If it is determined in the step S502 that the character code of the object character is an existing space character code, the character determination section 15 determines whether or not the object character contains no additional image to be drawn (step S506). If the object character contains an additional image, the color/monochrome determination section 16 performs the normal color/monochrome determination so as to determine whether the color attribute of the additional image is color or monochrome (step S504). In this case, for example, if the object character is a space character with a colored underline (additional image) as shown in FIG. 5C, the object character is determined to be "in color".

Figure 5D:

If it is determined in the step S506 that the object character contains no additional image, the character determination section 15 determines whether or not a background color is set for the object character (step S507). If a background color is set for the object character as shown in FIG. 5D, the color/monochrome determination section 16 performs the normal color/monochrome determination so as to determine the color attribute of the background color (step S504).

On the other hand, if it is determined in the step S507 that no background color is set for the object character, it is determined that the object character is a character which is not necessary to be drawn, and even if a color is set for the object character, the object character is determined to be "in monochrome" (step S508). In this case, the object character is not subjected to the color/monochrome determination by the color/monochrome determination section 16, and the present process is immediately terminated so as to deal with the following object character.

According to the process shown in FIG. 4, when an object character is a space character which is not necessary to be drawn, the print data control section 13 determines that the object character is "in monochrome" and the color/monochrome determination section 16 does not perform the color/monochrome determination, so that color/monochrome determination for object characters can be efficiently carried out.

Further, when the object character is not a normal font (NO to the step S501), the host apparatus 100 determines based on the glyph processing whether or not a drawing object exists, and then performs the accurate color/monochrome determination (step S505), so that the color/monochrome determination for object characters can be carried out efficiently and accurately.

Although in the present embodiment, the step S503 is carried out after execution of the step S502, the order of the two steps S502 and S503 may be reversed. Further, although in the present embodiment, the steps S506 and S507 are carried out after execution of the step S502, and then in the step S508, an object character is determined to be "in monochrome", the process may be configured such that the step S508 is carried out immediately after execution of the step S502 without execution of the steps S506 and S507.

Further, although the process in the present embodiment is carried out by the print data control section 13 of the printer driver 11 included in the host apparatus 100, it may be executed by the printer 7.

Further, it is to be understood that the object of the present invention may also be accomplished by supplying a system or an apparatus with a storage medium in which a program code of software, which realizes the functions of the above described embodiment is stored, and causing a computer (or CPU or MPU) of the system or apparatus to read out and execute the program code stored in the storage medium.

The above program has only to realize the functions of the above described embodiment on a computer, and the form of the program may be an object code, a program code executed by an interpreter, or script data supplied to an OS.

In this case, the program code itself read from the storage medium realizes the functions of the above described embodiment, and therefore the program code and the storage medium in which the program code is stored constitute the present invention.

Examples of the storage medium for supplying the program code include a floppy (registered trademark) disk, a hard disk, a magnetic-optical disk, an optical disk such as a CD-ROM, a CD-R, a CD-RW, a DVD-ROM, a DVD-RAM, a DVD-RW, and a DVD+RW, a magnetic tape, a nonvolatile memory card, and a ROM. Alternatively, the program may be downloaded via a network from another computer, a database, or the like, not shown, connected to the Internet, a commercial network, a local area network, or the like.

Further, it is to be understood that the functions of the above described embodiment may be accomplished not only by executing the program code read out by a computer, but also by causing an OS (operating system) or the like which operates on the computer to perform a part or all of the actual operations based on instructions of the program code.

Further, it is to be understood that the functions of the above described embodiment may be accomplished by writing a program code read out from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

This application claims the benefit of Japanese Application No. 2005-130568, filed Apr. 27, 2005, which is hereby incorporated by reference herein in its entirety.

What is claimed is:

1. An information processing apparatus for determining whether a print object is in color or monochrome, comprising:
a character determination unit that is operable to determine whether a character as the print object is a character which is necessary to be drawn or a character which is not necessary to be drawn by determining whether the character as the print object corresponds to a specific character code and whether the character as the print object contains an additional image to be drawn; and
a monochrome determination unit that is operable to determine whether the character as the print object is in color or in monochrome based on a color attribute of the character in a case where said character determination unit determines that the character as the print object is a character which is necessary to be drawn,
wherein said monochrome determination unit is operable to determine that the character as the print object is in monochrome regardless of the color attribute of the character in a case where said character determination unit determines that the character as the print object is a character which is not necessary to be drawn, and
wherein the color attribute of the character is a foreground color attribute, such that said monochrome determination unit is operable to determine that the character as the print object is in monochrome regardless of the foreground color attribute of the character in a case where said character determination unit determines that the character as the print object is a character which is not necessary to be drawn.

2. A color/monochrome determination method performed by an information processing apparatus that determines whether a print object is in color or monochrome, the method comprising:
- a character determination step of determining whether a character as the print object is a character which is necessary to be drawn or a character which is not necessary to be drawn by determining whether the character as the print object corresponds to a specific character code and whether the character as the print object contains an additional image to be drawn; and
- a monochrome determination step of determining whether the character as the print object is in color or in monochrome based on a color attribute of the character in a case where said character determination step determines that the character as the print object is a character which is necessary to be drawn,
- wherein said monochrome determination step determines that the character as the print object is in monochrome regardless of the color attribute of the character in a case where it is determined in said character determination step that the character as the print object is a character which is not necessary to be drawn,
- wherein the color attribute of the character is a foreground color attribute, such that said monochrome determination step determines that the character as the print object is in monochrome regardless of the foreground color attribute of the character in a case where said character determination step determines that the character as the print object is a character which is not necessary to be drawn, and
- wherein the character determination step and the monochrome determination step are performed by the information processing apparatus.

3. A non-transitory computer-readable storage medium storing a program configured to be executed by a computer in an information processing apparatus, the program configured to cause the information processing apparatus to determine whether a print object is in color or monochrome, and the program comprising:
- a character determination module configured to determine whether a character as the print object is a character which is necessary to be drawn or a character which is not necessary to be drawn by determining whether the character as the print object corresponds to a specific character code and whether the character as the print object contains an additional image to be drawn; and
- a monochrome determination module configured to determine whether the character as the print object is in color or in monochrome based on a color attribute of the character in a case where said character determination module determines that the character as the print object is a character which is necessary to be drawn,
- wherein said monochrome determination module is configured to determine that the character as the print object is in monochrome regardless of the color attribute of the character in a case where said character determination module has determined that the character as the print object is a character which is not necessary to be drawn, and
- wherein the color attribute of the character is a foreground color attribute, such that said monochrome determination module is configured to determine that the character as the print object is in monochrome regardless of the foreground color attribute of the character in a case where said character determination module determines that the character as the print object is a character which is not necessary to be drawn.

4. An information processing apparatus for determining whether a print object is in color or monochrome, comprising:
- a character determination unit that is operable to determine whether a character as the print object is a character which is necessary to be drawn or a character which is not necessary to be drawn by determining whether the character as the print object corresponds to a specific character code and whether the character as the print object contains an additional image to be drawn; and
- a monochrome determination unit that is operable to determine whether the character as the print object is in color or in monochrome based on a color attribute of the character in a case where said character determination unit determines that the character as the print object is a character which is necessary to be drawn,
- wherein said monochrome determination unit is operable to determine that the character as the print object is in monochrome regardless of the color attribute of the character in a case where said character determination unit determines that the character as the print object is a character which is not necessary to be drawn, and
- wherein the color attribute of the character is a non-background color attribute, such that said monochrome determination unit is operable to determine that the character as the print object is in monochrome regardless of the non-background color attribute of the character in a case where said character determination unit determines that the character as the print object is a character which is not necessary to be drawn.

5. A color/monochrome determination method performed by an information processing apparatus that determines whether a print object is in color or monochrome, the method comprising:
- a character determination step of determining whether a character as the print object is a character which is necessary to be drawn or a character which is not necessary to be drawn by determining whether the character as the print object corresponds to a specific character code and whether the character as the print object contains an additional image to be drawn; and
- a monochrome determination step of determining whether the character as the print object is in color or in monochrome based on a color attribute of the character in a case where said character determination step determines that the character as the print object is a character which is necessary to be drawn,
- wherein said monochrome determination step determines that the character as the print object is in monochrome regardless of the color attribute of the character in a case where it is determined in said character determination step that the character as the print object is a character which is not necessary to be drawn,
- wherein the color attribute of the character is a non-background color attribute, such that said monochrome determination step determines that the character as the print object is in monochrome regardless of the non-background color attribute of the character in a case where said character determination step determines that the character as the print object is a character which is not necessary to be drawn, and
- wherein the character determination step and the monochrome determination step are performed by the information processing apparatus.

6. A non-transitory computer-readable storage medium storing a program configured to be executed by a computer in an information processing apparatus, the program configured to cause the information processing apparatus to determine whether a print object is in color or monochrome, and the program comprising:
- a character determination module configured to determine whether a character as the print object is a character which is necessary to be drawn or a character which is not necessary to be drawn by determining whether the character as the print object corresponds to a specific character code and whether the character as the print object contains an additional image to be drawn; and
- a monochrome determination module configured to determine whether the character as the print object is in color or in monochrome based on a color attribute of the character in a case where said character determination module determines that the character as the print object is a character which is necessary to be drawn,
- wherein said monochrome determination module is configured to determine that the character as the print object is in monochrome regardless of the color attribute of the character in a case where said character determination module has determined that the character as the print object is a character which is not necessary to be drawn, and
- wherein the color attribute of the character is a non-background color attribute, such that said monochrome determination module is configured to determine that the character as the print object is in monochrome regardless of the non-background color attribute of the character in a case where said character determination module determines that the character as the print object is a character which is not necessary to be drawn.

7. An information processing apparatus according to claim 1, wherein said character determination unit is operable to determine whether the character as the print object is a character which is necessary to be drawn or the character which is not necessary to be drawn by determining whether the character as the print object has the specific character code, whether the character as the print object contains the additional image to be drawn, and whether a background color is set to the character as the print object.

8. An information processing apparatus according to claim 1, wherein the specific character code is a space code.

9. An information processing apparatus according to claim 1, further comprising:
- a generating unit operable to generate a result of the determination made by the monochrome determination unit as part of print data configured to be processed by a printer for printing; and
- a transmitting unit operable to transmit the print data to the printer.

10. A color/monochrome determination method according to claim 2, wherein said character determination step determines whether the character as the print object is a character which is necessary to be drawn or the character which is not necessary to be drawn by determining whether the character as the print object has the specific character code, whether the character as the print object contains the additional image to be drawn, and whether a background color is set to the character as the print object.

11. A color/monochrome determination method according to claim 2, wherein the specific character code is a space code.

12. A color/monochrome determination method according to claim 2, further comprising:
- a generating step of generating a result of the determination made by the monochrome determination step as part of print data configured to be processed by a printer for printing; and
- a transmitting step of transmitting the print data to the printer.

13. A non-transitory computer-readable storage medium according to claim 3, wherein said character determination module is configured to determine whether the character as the print object is a character which is necessary to be drawn or the character which is not necessary to be drawn by determining whether the character as the print object has the specific character code, whether the character as the print object contains the additional image to be drawn, and whether a background color is set to the character as the print object.

14. A non-transitory computer-readable storage medium according to claim 3, wherein the specific character code is a space code.

15. A non-transitory computer-readable storage medium according to claim 3, further comprising:
- a generating module configured to generate a result of the determination made by the monochrome determination module as part of print data configured to be processed by a printer for printing; and
- a transmitting module configure to transmit the print data to the printer.

16. An information processing apparatus according to claim 4, wherein said character determination unit is operable to determine whether the character as the print object is a character which is necessary to be drawn or the character which is not necessary to be drawn by determining whether the character as the print object has the specific character code, whether the character as the print object contains the additional image to be drawn, and whether a background color is set to the character as the print object.

17. An information processing apparatus according to claim 4, wherein the specific character code is a space code.

18. An information processing apparatus according to claim 4, further comprising:
- a generating unit operable to generate a result of the determination made by the monochrome determination unit as part of print data configured to be processed by a printer for printing; and
- a transmitting unit operable to transmit the print data to the printer.

19. A color/monochrome determination method according to claim 5, wherein said character determination step determines whether the character as the print object is a character which is necessary to be drawn or the character which is not necessary to be drawn by determining whether the character as the print object has the specific character code, whether the character as the print object contains the additional image to be drawn, and whether a background color is set to the character as the print object.

20. A color/monochrome determination method according to claim 5, wherein the specific character code is a space code.

21. A color/monochrome determination method according to claim 5, further comprising:
- a generating step of generating a result of the determination made by the monochrome determination unit as part of print data configured to be processed by a printer for printing; and
- a transmitting step of transmitting the print data to the printer.

22. A non-transitory computer-readable storage medium according to claim 6, wherein said character determination module is configured to determine whether the character as the print object is a character which is necessary to be drawn or the character which is not necessary to be drawn by determining whether the character as the print object has the specific character code, whether the character as the print object contains the additional image to be drawn, and whether a background color is set to the character as the print object.

23. A non-transitory computer-readable storage medium according to claim 6, wherein the specific character code is a space code.

24. A non-transitory computer-readable storage medium according to claim 6, further comprising:
- a generating module configured to generate a result of the determination made by the monochrome determination unit as part of print data configured to be processed by a printer for printing; and
- a transmitting unit module configured to transmit the print data to the printer.

* * * * *